United States Patent [19]
Picard

[11] Patent Number: 5,178,664
[45] Date of Patent: Jan. 12, 1993

[54] ESSENTIALLY ANHYDROUS ADMIXTURES OF DEHYDRATED RARE EARTH HALIDES AND ALKALI/ALKALINE EARTH METAL HALIDES

[75] Inventor: Francoise Picard, Fontenay/Sous/Bois, France

[73] Assignee: Rhone-Poulenc Chimie, Courbevoie, France

[21] Appl. No.: 541,939

[22] Filed: Jun. 22, 1990

[30] Foreign Application Priority Data

Jun. 22, 1989 [FR] France ................ 89 08316

[51] Int. Cl.$^5$ ............................................. C01F 17/00
[52] U.S. Cl. ..................................... 75/300; 423/263
[58] Field of Search ........................ 423/263; 75/300

[56] References Cited

U.S. PATENT DOCUMENTS

| | | | |
|---|---|---|---|
| 1,289,079 | 12/1918 | Balke | 423/263 |
| 1,331,257 | 2/1920 | Heap et al. | 423/263 |
| 3,153,570 | 10/1964 | Domning et al. | 423/263 |
| 3,821,356 | 6/1974 | Baldwin | 423/263 |
| 4,051,219 | 9/1977 | Hafner | 423/263 |
| 4,105,747 | 8/1978 | Eisele et al. | 423/263 |
| 4,462,970 | 7/1984 | Pastor | 423/263 |

FOREIGN PATENT DOCUMENTS 1244305  9/1960  France .

OTHER PUBLICATIONS

H. Bergmann, Gmelin Handbuch der Anorganischen Chemie, Ed. 8, DT, Berlin, Springer, pp. 163–165.
Chemical Abstracts, vol. 75, No. 24, Abstract No. 147241M, Dec. 13, 1977.
M. D. Taylor, "Preparation of Anhydrous Lanthanon Halides", Chem. Rev., vol. 62, 1962, pp. 503–511.
M. D. Taylor et al., "Preparation of Anhydrous Lanthanide Halides Especially Iodides", J. Inorg. Nucl. Chem., 1962, vol. 24, pp. 387–391.
Kirk-Othmer, Encyclopedia of Chemical Technology, 3rd Ed., 1979, vol. 8, pp. 95–98.
Perry's Chemical Engineers' Handbook, Sixth Edition, 1984, pp. 20:22–20:25.

Primary Examiner—Peter D. Rosenberg
Attorney, Agent, or Firm—Burns, Doane, Swecker & Mathis

[57] ABSTRACT

Essentially anhydrous (i.e., containing no more than 2.5% by weight of water of hydration) admixtures of (i) dehydrated rare earth halides, (ii) at least 10% by weight of alkali and/or alkaline earth metal halides, and (iii) up to 4.5% by weight of rare earth oxyhalides, these halides being other than fluorides, are produced by mixing hydrated rare earth halides with alkali and/or alkaline earth metal halides and then raising the temperature of such admixtures, advantageously in the presence of a gaseous flux containing a dehydrating halocompound, to a value ranging from 150° to 350° C. as to essentially dehydrate the hydrated rare earth halides, the final admixtures are well adapted for the production of rare earth metals therefrom.

17 Claims, No Drawings

ESSENTIALLY ANHYDROUS ADMIXTURES OF DEHYDRATED RARE EARTH HALIDES AND ALKALI/ALKALINE EARTH METAL HALIDES

BACKGROUND OF THE INVENTION

1. Field of the Invention

The present invention relates to novel dehydrated, essentially anhydrous mixtures of rare earth halides and alkaline earth or alkali metal halides and to a process for the production thereof.

This invention more especially relates to admixtures of rare earth halides and alkaline earth or alkali metal halides of the chloride, bromide or iodide type, comprising a very low percentage of water and a very low amount of rare earth oxyhalide values.

2. Description of the Prior Art

The rare earth halides are typically produced in an aqueous medium, for example by acid digestion of a rare earth oxide in an aqueous medium.

Thus, the halides produced, with the exception of the fluoride, are hydrated halides comprising a number of molecules of water, typically from 3 to 9 per molecule of halide.

This structural water is deleterious in certain applications or end uses of the halides, such as, for example, chemical or electrochemical reduction processes for the production of metal, e.g., the production of neodymium or of an alloy of neodymium with other metals.

Many processes for the dehydration of these hydrated rare earth halides have been proposed to this art.

Thus, V. W. Wendlandt, in *J. Inorg. Nucl. Chem.*, 5, 118 (1957), describes the thermal decomposition of hydrated rare earth chlorides. Such dehydration allows the halide monohydrate to be obtained. However, the removal of this last molecule of water requires heating to a temperature above 200° C. At this temperature, rare earth halides are converted into the oxyhalides. The presence of these oxyhalides also adversely affects the metal production processes referred to above.

Dehydrating processes have also been proposed to this art employing a dehydrating agent such as hydrogen halides, ammonium halides, carbon tetrachloride, phosgene or $SOCl_2$, as well as the halogens. The processes described especially by Matignon (*C.R. accord. Sci.*, 134, 427 (1902)) and Kleinheksel and Kremers (*JACS*, 50, 959 (1928)) entail passing a gaseous stream of a dehydrating agent over the hydrated halide. However, these processes do not permit lowering the concentration of water and/or of oxyhalide to low values, especially when the mass of rare earth halides to be dehydrated is large.

Such processes cannot, therefore, be carried out on an industrial scale.

SUMMARY OF THE INVENTION

Accordingly, a major object of the present invention is the provision of an improved process for the dehydration of hydrated rare earth halides to produce, on an industrial scale, novel halide admixtures containing low contents both of water and of oxyhalide values and including alkaline earth or alkali metal halides.

Briefly, the present invention features novel dehydrated mixtures of rare earth halides and alkaline earth or alkali metal halides, with the exception of the fluorides, comprising at least 10% by weight of alkaline earth or alkali metal halide and a water content ranging from 0.01% to 2.5%, while the rare earth oxychloride content ranges from 0.01% to 4.5%.

DETAILED DESCRIPTION OF THE PREFERRED EMBODIMENTS OF THE INVENTION

More particularly according to the present invention, the subject admixtures, which contain but minor amounts of water and oxychloride values, are especially useful raw materials in metallurgical processes for the production of rare earth metals, such as the electrolytic processes, or the reduction of rare earth halides by an alkali metal or alkaline earth metal.

In one embodiment of the invention, the alkaline earth or alkali metal halide is present in the mixture in a concentration by weight of at least 10%, advantageously greater than 15% and preferably ranging from 15% to 60%.

These percentages correspond to the amounts by weight expressed relative to the total weight of the mixture.

The alkaline earth or alkali metal halides can be present either alone or as mixtures with alkali metal or alkaline earth metal halides.

Exemplary alkaline earth or alkali metal halides include the calcium, barium, magnesium, lithium, sodium and potassium halides.

The halogen in the alkaline earth or alkali metal halide can either be different from or identical to that of the rare earth halide.

The preferred alkaline earth halide of the invention is calcium chloride and the preferred alkali metal halide is sodium chloride or potassium chloride.

By the expression "rare earths" (RE) are intended the rare earth elements designated the lanthanides which have atomic numbers ranging from 57 to 71, inclusive, as well as yttrium which has an atomic number of 39. In addition, by "ceric rare earths" are intended the lightest elements, beginning with lanthanum and extending to samarium in terms of atomic number, and by "yttric rare earths" are intended the heaviest elements of the rare earths, beginning with europium and extending to lutetium, and including yttrium.

The present invention is applicable to all of the halides of these elements and especially to the halides of lanthanum, neodymium, cerium, praseodymium, yttrium and gadolinium.

It will of course be appreciated that this invention features only hydrated rare earth halides. Thus, the rare earth fluorides are without the scope of this invention, as they do not contain any water of hydration, as are the rare earth halides obtained by an anhydrous route.

The present invention also features a process for the preparation of the above novel admixtures by dehydration of hydrated halides.

This process comprises mixing the hydrated rare earth halide with an alkaline earth or alkali metal halide and raising the temperature of such admixture to a value ranging from 150° C. to 350+ C. This dehydration is advantageously carried out under partial pressure, for example under a pressure on the order of 1,300 Pa.

By "admixture" or simply "mixture" is intended a more or less homogeneous mixture of the two halide powders. This mixture can be produced by any means and the homogeneity of such mixture is not critical according to the present invention.

The optimum temperatures or temperature ranges for dehydration are different for each rare earth halide and depend particularly on the dehydration temperature at which the last molecule of water of the hydrated halide is driven off.

Advantageously, the rare earth halides to be dehydrated and the alkaline earth or alkali metal halides have halogen atoms which are of the same nature.

Moreover, it can be advantageous to use, as the rare earth halide, a halide previously pre-dried by heating, advantageously under reduced pressure, before being mixed with the alkali metal or alkaline earth metal halide.

It is also within the scope of the invention, to pass a gaseous flux comprising at least one dehydrating halogenated compound, such as, for example, hydrogen halides, ammonium halides, the halogens, carbon tetrachloride, phosgene or $S_2Cl_2$, over or through the mass of the mixture.

In order to further illustrate the present invention and the advantages thereof, the following specific examples are given, it being understood that same are intended only as illustrative and in nowise limitative.

EXAMPLE 1

Hydrated neodymium chloride (6.9 moles of water per mole of $NdCl_3$) was intimately admixed with calcium chloride to provide a mixture containing 70% by weight of neodymium chloride and 30% by weight of $CaCl_2$.

This mixture was then heated under reduced pressure (on the order of 1,300 Pa) at a temperature of 240° C for 3 hours. Advantageously, the rise in temperature was 1.3° C./min.

After cooling, the resulting mixture contained 1.4% of water and 4.1% of neodymium oxychloride (amounts by weight).

EXAMPLE 2

The procedure of Example 1 was repeated, but producing a neodymium chloride/calcium chloride mixture containing 50% of calcium chloride. The mixture obtained after heating at 300° C. under a pressure of 1,300 Pa contained 2% of water and 3.3% of neodymium oxychloride.

EXAMPLE 3

The procedure of Example 1 was repeated, but using a mixture containing 85% of $NdCl_3$ and 15% of $CaCl_2$.

The resulting mixture had a water content of 1.3% and an oxychloride content of 4.3%.

EXAMPLE 4

The procedure of Example 1 was repeated, but using a mixture containing 70% of $NdCl_3$ and 30% of potassium chloride.

The resulting mixture contained 2% of water and 2.7% of neodymium oxychloride.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An essentially anhydrous admixture of (i) a dehydrated rare earth halide, (ii) at least one of an alkali and alkaline earth metal halide and (iii) a rare earth oxyhalide, said halides being other than the fluorides, and said admixture comprising at least 10% by weight of said at least one of an alkali and alkaline earth metal halide (ii), an amount of water of hydration ranging from 0.01% to 2.5% by weight, and an amount of rare earth oxyhalide values ranging from 0.01% to 4.5% by weight.

2. The essentially anhydrous mixture as defined by claim 1, said halides and oxyhalide comprising chlorides.

3. The essentially anhydrous admixture as defined by claim 1, said rare earths comprising a lanthanide or yttrium.

4. The essentially anhydrous admixture as defined by claim 3, said rare earths comprising lanthanum, neodymium, praseodymium, yttrium, gadolinium or cerium.

5. The essentially anhydrous admixture as defined by claim 1, comprising at least 15% by weight of said at least one of an alkali and alkaline earth metal halide (ii).

6. The essentially anhydrous admixture as defined by claim 5, comprising from 15% to 60% by weight of said at least one of an alkali and alkaline earth metal halide (ii).

7. The essentially anhydrous admixture as defined by claim 1, comprising a calcium, barium or magnesium halide.

8. The essentially anhydrous admixture as defined by claim 1, comprising a sodium, lithium or potassium halide.

9. The essentially anhydrous admixture as defined by claim 7, comprising calcium chloride.

10. A process for the preparation of an essentially anhydrous admixture of (i) a dehydrated rare earth halide, (ii) at least one of an alkali and alkaline earth metal halide and (iii) a rare earth oxyhalide, said halides being other than the fluorides, and said admixture comprising at least 10% by weight of said at least one of an alkali and alkaline earth metal halide (ii), an amount of water of hydration ranging from 0.01% to 2.5% by weight, an amount of rare earth oxyhalide values ranging from 0.1% to 4.5% by weight, comprising steps of intimately admixing a hydrated rare earth halide with at least one of an alkali and alkaline earth metal halide, and then raising the temperature of such admixture to a value ranging from 150° C. to 350° C. as to essentially dehydrate said hydrated rare earth halide.

11. The process as defined by claim 10, carried out under reduced pressure.

12. The process as defined by claim 10, said hydrated rare earth halide having been pre-dried.

13. The process as defined by claim 10, further comprising passing a gaseous flux including at least one dehydrating halocompound over or through such admixture.

14. The process as defined by claim 13, said at least one dehydrating halocompound comprising a hydrogen halide, an ammonium halide, a halogen, carbon tetrachloride, phosgene or $S_2Cl_2$.

15. The process as defined by claim 10, wherein the admixing step is performed by mixing powers of the hydrated earth halide and the at least one of an alkali and alkaline earth metal halide.

16. The process as defined by claim 10, wherein the admixing step is performed by mixing powers of hydrated neodymium chloride and calcium chloride.

17. The process as defined by claim 10, wherein the admixing step is performed by mixing powers of hydrated neodymium chloride and potassium chloride.

* * * * *